United States Patent
Kannan

(10) Patent No.: US 11,603,212 B1
(45) Date of Patent: Mar. 14, 2023

(54) STRUT WITH INNER DAMPER ROD

(71) Applicant: Hamilton Sundstrand Corporation, Charlotte, NC (US)

(72) Inventor: Kanthi Gnanam Kannan, Katy, TX (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/519,042

(22) Filed: Nov. 4, 2021

(51) Int. Cl.
*B64D 41/00* (2006.01)
*F03D 9/32* (2016.01)
*B64D 27/26* (2006.01)
*F02C 7/20* (2006.01)
*F02C 7/32* (2006.01)

(52) U.S. Cl.
CPC ............ *B64D 41/007* (2013.01); *F03D 9/32* (2016.05); *B64D 27/26* (2013.01); *B64D 2027/266* (2013.01); *F02C 7/20* (2013.01); *F02C 7/32* (2013.01); *F05B 2220/31* (2013.01); *F05D 2220/34* (2013.01); *F05D 2260/96* (2013.01)

(58) Field of Classification Search
CPC B64D 41/007; B64D 27/26; B64D 2027/266; F03D 9/32; F05B 2220/31; F05D 2220/34; F05D 2260/96; F02C 7/20; F02C 7/32
See application file for complete search history.

(56) References Cited

U.S. PATENT DOCUMENTS

| | | | | |
|---|---|---|---|---|
| 4,676,458 A * | 6/1987 | Cohen | .................. | B64D 41/007 244/58 |
| 4,717,095 A * | 1/1988 | Cohen | .................. | B64D 41/007 244/58 |
| 5,820,074 A * | 10/1998 | Trommer | ............. | B64D 41/007 244/58 |
| 6,331,099 B1 * | 12/2001 | Eccles | .................. | B64D 41/007 416/142 |
| 10,132,245 B2 | 11/2018 | Jiang et al. | | |
| 11,014,688 B2 | 5/2021 | Kuehn et al. | | |
| 2011/0229342 A1 * | 9/2011 | Russ | .................... | B64D 41/007 416/246 |
| 2017/0350463 A1 * | 12/2017 | Sasscer | ................... | F16F 9/145 |
| 2018/0363495 A1 * | 12/2018 | Polin | ......................... | F03D 9/32 |
| 2020/0309091 A1 * | 10/2020 | Bortoli | .................... | F01D 15/10 |

* cited by examiner

*Primary Examiner* — Gerald L Sung
*Assistant Examiner* — Rene D Ford
(74) *Attorney, Agent, or Firm* — Cantor Colburn LLP

(57) ABSTRACT

A strut system for a RAT includes a strut body, a strut first end is connected to the aircraft and rotate about a first axis, a strut second end is spaced apart from the strut first end by the strut body and is connected to the RAT turbine generator unit, the strut has a strut conduit extending from the strut first end toward the strut second end; and a damper rod that includes a rod body and disposed within the strut conduit, the damper rod having a rod first end that is fixed within the strut conduit at the strut first end, and a rod second end that is spaced apart from the rod first end by the rod body and is located intermediate the strut first end and the strut second end, wherein the rod second end moves along a second axis that is parallel to the first axis.

18 Claims, 6 Drawing Sheets

STRUT WITH INNER DAMPER ROD

BACKGROUND

Exemplary embodiments pertain to struts and more specifically to struts configured for connecting a ram-air turbine (RAT) to an aircraft and which include an inner damper rod.

A strut is a primary structural member and may be utilized to connect a movable component to a stationary component. For example, a strut may be utilized to connect the turbine-generator units of the RAT to the aircraft. The strut may be configured to pivot relative to the aircraft for deployment of the RAT and stowing the RAT.

BRIEF DESCRIPTION

Disclosed is a strut system for coupling a ram-air turbine (RAT) to an aircraft, including: a strut that includes a strut body, the strut having a strut first end that is configured to connect to the aircraft and rotate about a first axis, the strut having a strut second end that is spaced apart from the strut first end by the strut body and is configured to connect to the RAT, wherein the strut has a strut conduit extending from the strut first end toward the strut second end; and a damper rod that includes a rod body and disposed within the strut conduit, the damper rod having a rod first end that is fixed within the strut conduit at the strut first end, and a rod second end that is spaced apart from the rod first end by the rod body and is located intermediate the strut first end and the strut second end, wherein the rod second end is configured to move along a second axis that is parallel to the first axis.

In addition to one or more of the above aspects of the system, or as an alternate, the rod second end is configured such that is forms a bushing, and the system further includes: a guide shaft that extends through the strut, along the second axis, and through the bushing.

In addition to one or more of the above aspects of the system, or as an alternate, the guide shaft is a shank of a bolt; and the bolt includes a bolt head disposed against an outer surface of the strut, and the bolt has a threaded end spaced apart from the bolt head by the guide shaft and extends through the outer surface of the strut; and the system further includes a nut that is configured to engage the threaded end and secure the bolt to the strut.

In addition to one or more of the above aspects of the system, or as an alternate, the strut first end has a strut inner base that defines an opened end of the strut conduit; and the system further includes: a ring flange that is fixed to the strut inner base, the ring flange having a flange aperture that opens to the strut conduit, wherein the rod first end has a shoulder portion that is larger than the flange aperture and a threaded shaft that extends from the shoulder portion and though the flange aperture; and another nut that is secured to the threaded shaft, to secure the damper rod within the strut conduit.

In addition to one or more of the above aspects of the system, or as an alternate, the rod body is sized so that when the damper rod is secured to the strut inner base, the damper rod is under tension loading against the guide shaft to maintain a slip or sliding contact between the bushing and the guide shaft.

In addition to one or more of the above aspects of the system, or as an alternate, the strut first end has a shaft bore that is defined along the first axis; and the shaft bore is adjacent to the strut inner base and the strut conduit.

In addition to one or more of the above aspects of the system, or as an alternate, the rod body has a rectangular cross section defining a rod width that is wider along the second axis; the strut conduit defines a diameter, wherein the rod width is between sixty percent and ninety percent of the diameter of the strut conduit; the strut conduit defines a first length; and the damper rod defines a second length that is less than the first length. The rod cross section dimensions would be sized such as to allow relative motion at guide shaft to bushing interface due to lateral vibration loads.

In addition to one or more of the above aspects of the system, or as an alternate, the damper rod is formed of high strength steel and the guide shaft is case-hardened metal.

Further disclosed is an aircraft including a ram-air turbine (RAT); a strut system that couples the RAT to the aircraft, the strut system including: a strut that includes a strut body, the strut having a strut first end that is connected to the aircraft and configured to rotate about a first axis, the strut having a strut second end that is spaced apart from the strut first end by the strut body and is connected to the RAT, wherein the strut has a strut conduit extending from the strut first end toward the strut second end; and a damper rod that includes a rod body and disposed within the strut conduit, the damper rod having a rod first end that is fixed within the strut conduit at the strut first end, and a rod second end that is spaced apart from the rod first end by the rod body and is located intermediate the strut first end and the strut second end, wherein the rod second end is configured to move along a second axis that is parallel to the first axis.

In addition to one or more of the above aspects of the aircraft, or as an alternate, the rod second end includes a bushing, and the strut system further includes a guide shaft that extends through the strut, along the second axis, and through the bushing.

In addition to one or more of the above aspects of the aircraft, or as an alternate, the guide shaft is a shank of a bolt; and the bolt includes a bolt head disposed against an outer surface of the strut, and the bolt has a threaded end spaced apart from the bolt head by the guide shaft and extends through the outer surface of the strut; and the system further includes a nut that is configured to engage the threaded end and secure the bolt to the strut.

In addition to one or more of the above aspects of the aircraft, or as an alternate, the strut first end has a strut inner base that defines an opened end of the strut conduit; the system further includes: a ring flange that is fixed to the strut inner base, the ring flange having a flange aperture that opens to the strut conduit, wherein the rod first end has a shoulder portion that is larger than the flange aperture and a threaded shaft that extends from the shoulder portion and though the flange aperture; and another nut that is secured to the threaded shaft, to secure the damper rod within the strut conduit.

In addition to one or more of the above aspects of the aircraft, or as an alternate, the rod body is sized so that when the damper rod is secured to the strut inner base, the damper rod is under tension loading against the guide shaft to maintain a contact between the bushing and the guide shaft.

In addition to one or more of the above aspects of the aircraft, or as an alternate, the strut first end has a shaft bore that is defined along the first axis; and the shaft bore is adjacent to the strut inner base and the strut conduit; and the strut system further includes a shaft that is connected to the aircraft and extends through the shaft bore.

In addition to one or more of the above aspects of the aircraft, or as an alternate, the rod body has a rectangular cross section defining a rod width that is wider along the second axis; the strut conduit defines a diameter, wherein the rod width is between sixty percent and ninety percent of the diameter of the strut conduit; the strut conduit defines a first length; and the damper rod defines a second length that is less than the first length.

In addition to one or more of the above aspects of the aircraft, or as an alternate, the damper rod is formed of high strength steel and the guide shaft is case-hardened metal.

Further disclosed is a method of configuring a strut that couples a ram-air turbine (RAT) to an aircraft, including: obtaining the strut that has a strut body, the strut having a strut first end that is configured to connect to the aircraft and rotate about a first axis, the strut having a strut second end that is spaced apart from the strut first end by the strut body and is configured to connect to the RAT, and the strut has a strut conduit extending from the strut first end toward the strut second end; obtaining a damper rod that has a rod body, a rod first end and a rod second end that is spaced apart from the rod first end by the rod body; and securing the damper rod within the strut conduit so that the rod first end is fixed within the strut conduit at the strut first end and the rod second end is located intermediate the strut first end and the strut second end and is configured to move along a second axis that is parallel to the first axis.

In addition to one or more of the above aspects of the method, or as an alternate, the method includes coupling the rod second end to a guide shaft that extends through the strut, along the second axis, via a bushing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
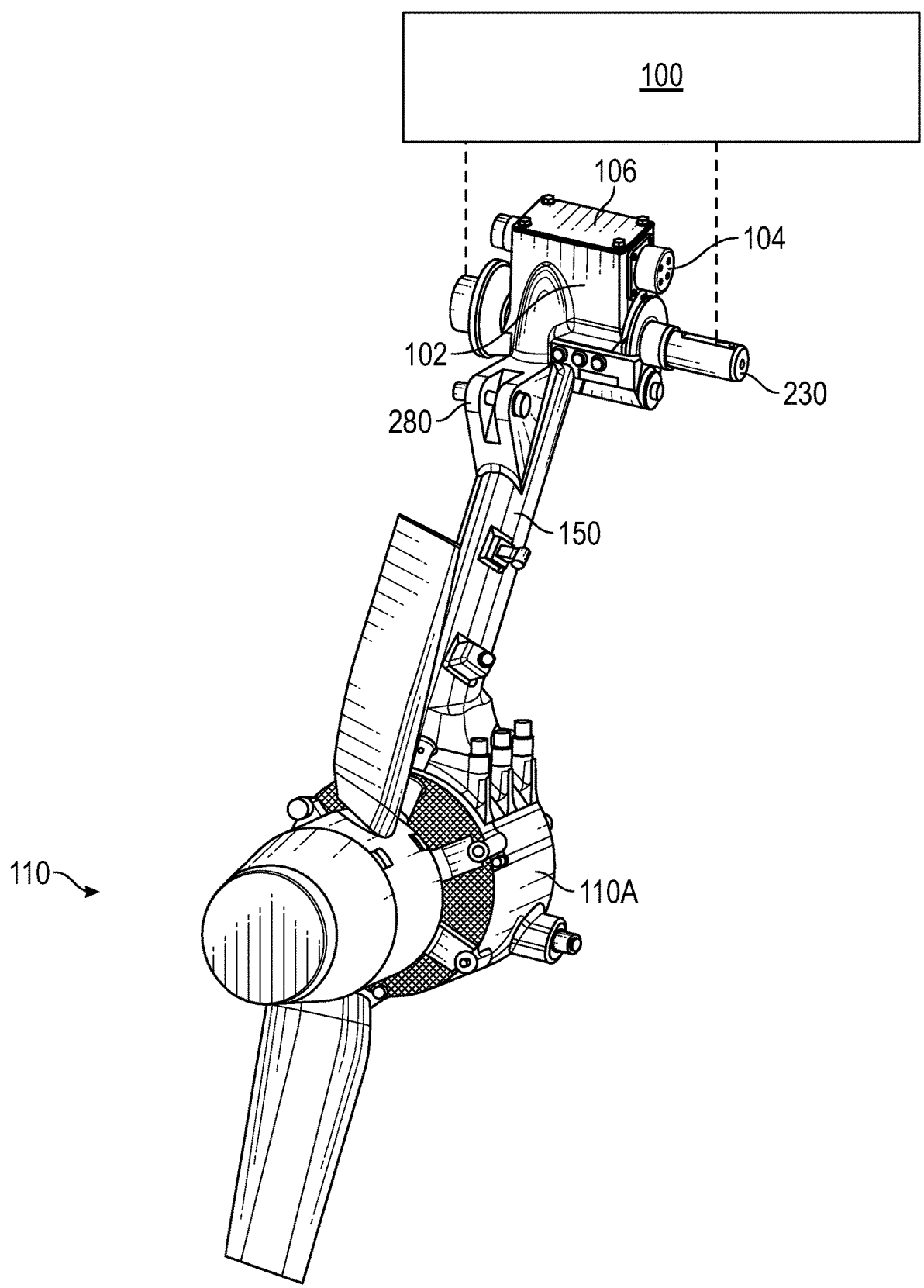
FIG. 1A a ram-air turbine (RAT) of an aircraft.
Figure 1B:
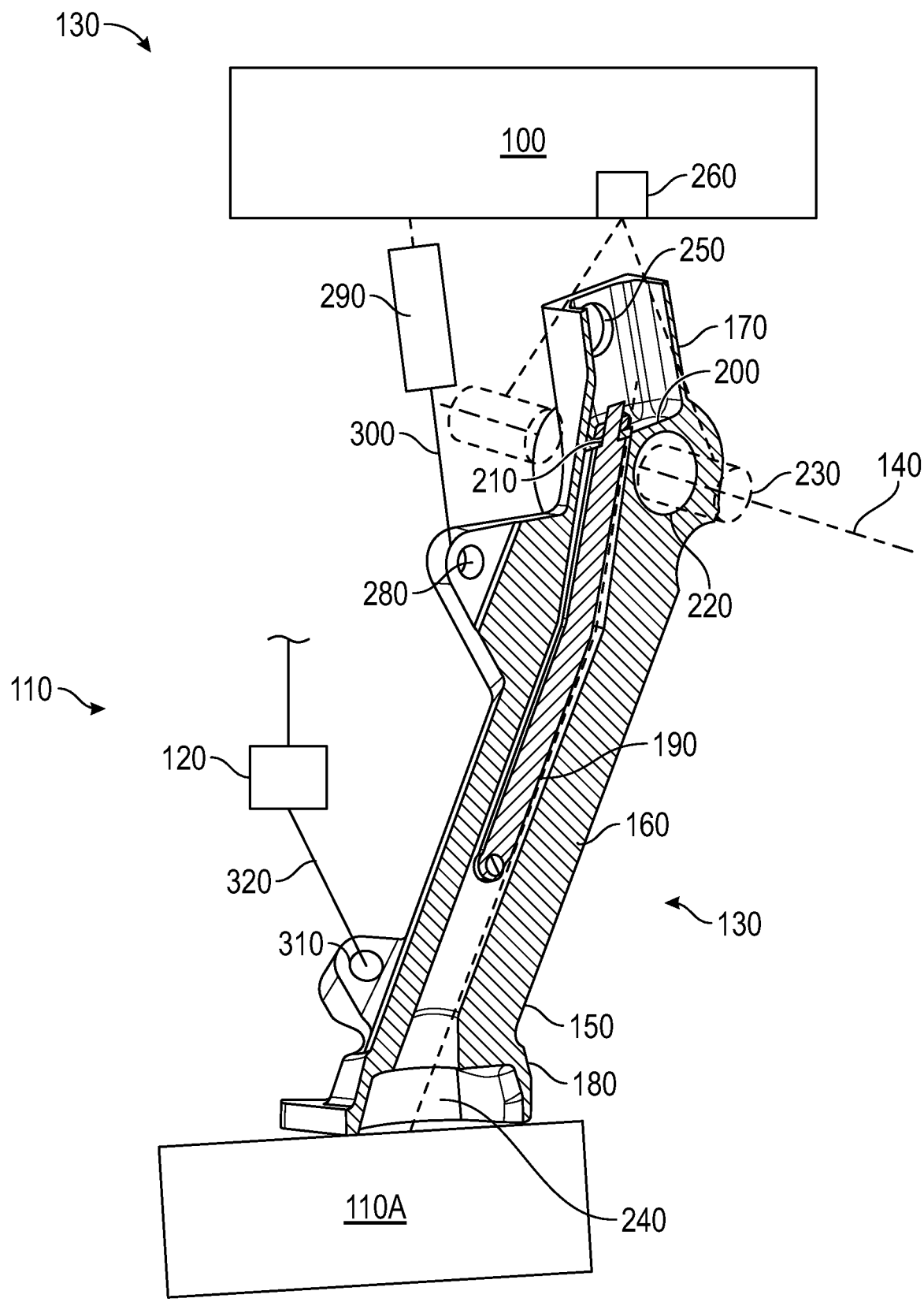
FIG. 1B shows a strut system with a strut of the RAT, shown in cross-section.

FIG. 1A shows a ram-air turbine (RAT) 110 with a turbine generator unit 110A and a strut 150 that connects the RAT 110 to an aircraft 100 (schematically illustrated). At one end the strut 150, an electrical outlet box 102 is located, which includes an outlet 104 and cover plate 106. Turning to FIG. 1B, additional features of the RAT 110 are shown, which may be concealed within the aircraft 100 by a RAT door 120 when stowed. The RAT 110, as indicated, is connected to the aircraft 100 via its strut system 130 that pivots about a first axis 140 (or pivot axis) when deploying or stowing the RAT 110.

The strut system 130 includes a strut 150. The strut 150 includes a strut body 160. The strut 150 has a strut first end 170 (or top end) that is connected to the aircraft 100 and configured to rotate about a first axis 140 (or strut rotation axis). The strut 150 has a strut second end 180 (or bottom end), separated from the strut first end 170 by the strut body 160, and which is connected to the turbine generator unit 110A. The strut 150 has a strut inner conduit 190 extending from the strut first end 170 toward the strut second end 180. The strut first end 170 has a strut inner base 200 that defines an opened end 210 of the strut conduit 190. The strut first end 170 has a shaft bore 220 that is defined along the first axis 140. The shaft bore 220 is adjacent to the strut inner base 200 and the strut conduit 190. A shaft 230 is connected to the aircraft 100, via aircraft mounts or lugs 260, and extends through the shaft bore 220 to provide a pivot for rotational motion of the strut 150. Conductive wires 240 extend through the strut conduit and are configured to electrically couple the turbine generator unit 110A to the aircraft 100 via the outlet 104 (FIG. 1). The strut first end 170 has an aperture 250 (FIG. 1B) that is adjacent to the strut inner base 200 and spaced apart from the strut conduit 190. The aperture 250 is utilized to connect the outlet box 102 (FIG. 1) to the strut.

The outer surface 270 of the strut 150 has an actuator eyelet 280, located adjacent to the strut first end 170. An actuator 290 is mounted between the aircraft 100 and the strut 150. This configuration controls a rotational position of strut 150 relative to the aircraft 100 by extending an actuator piston 300. The outer surface 270 of the strut 150 has a door link eyelet 310, located adjacent toward the strut second end 180. A door link 320 is connected between the RAT door 120 and the strut 150, which controls motion of the RAT door 120 when the strut 150 is moved via the actuator 290.

As disclosed in greater detail herein, the strut system 130 may be configured to dampen resonance induced loads that could occur along the first axis 140 (e.g., a lateral direction for the strut system 130) when the RAT 110 is in the deployed state.

Figure 2:
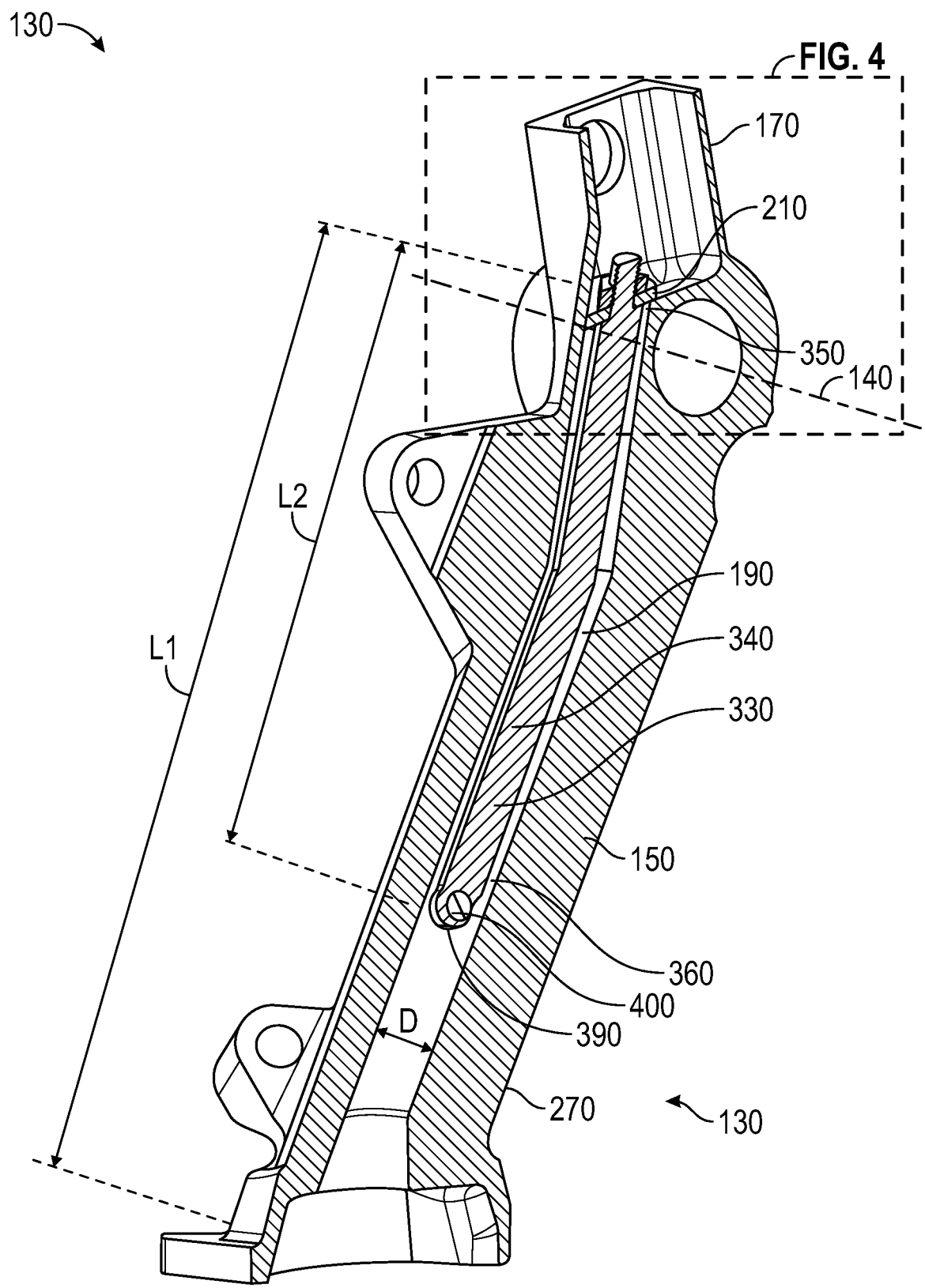
FIG. 2 shows the strut system of FIG. 1B, excluding, e.g., the turbine-generator unit of the RAT and aircraft, and identifies aspects of a damper rod located within a conduit of the strut.
Figure 3:
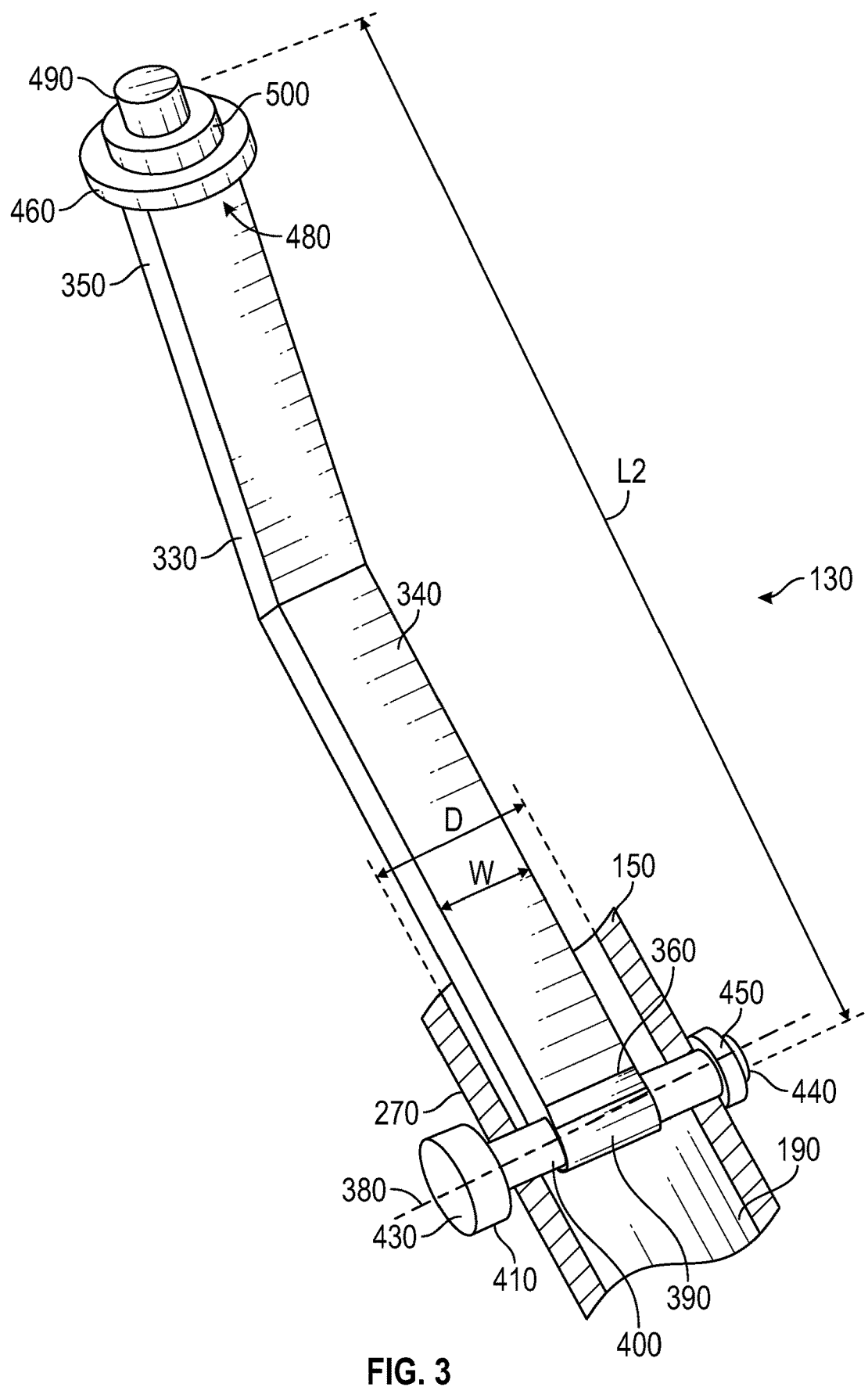
FIG. 3 shows additional details of the damper rod.

Turning to FIGS. 2 and 3, the strut system 130 includes a damper rod 330, which is located in the strut conduit 190. The damper rod 330 includes a rod body 340. The damper rod 330 has a rod first end 350 that is fixed within the strut conduit 190 at the strut first end 170. The damper rod 330 has a rod second end 360 that is spaced apart from the rod first end 350 by the rod body 340 and is located intermediate the strut first end 170 and the strut second end 180. The rod second end 360 is configured to move along a second axis 380 (FIG. 3) that is parallel to the first axis 140. The damper rod 330 may be high strength steel, as compared with the guide shaft 400 which may be a case-hardened metal component.

The rod second end 360 houses a bushing 390. The strut system 130 further includes a guide shaft 400 that extends through the strut 150, along the second axis 380, and through the bushing 390.

As shown in FIG. 3 the strut system 130 includes a bolt 410 and the guide shaft 400 is a shank of the bolt 410. The bolt 410 has a bolt head 430 disposed against an outer surface 270 (or outer wall) of the strut 150. The bolt 410 has a threaded end 440 spaced apart from the bolt head 430 by the guide shaft 400 and extends through the outer surface 270 of the strut 150. The strut system 130 includes a nut 450 (or first nut) engages the threaded end 440 to secure the bolt 410 to the strut 150. In one embodiment the guide shaft 400 is a pin.

The rod body 340 has a rectangular cross section defining a rod width W, which is configured to be wider along the second axis, i.e., its vibration axis. The strut conduit 190 defines an (inner) diameter D. The rod width W is between fifty percent and ninety percent of the diameter D of the strut conduit 190. This configuration enables the bushing 390 to slide against the guide shaft 400 sufficiently to generate friction and cause friction (Coulomb) damping. The rod cross section dimensions would be sized such as to allow relative motion at guide shaft to bushing interface due to lateral vibration loads. That is, the rod cross section would be sized to allow relative motion and would be based on the magnitude and the frequency range of the vibration loads.

The strut conduit 190 defines a first length L1 and the damper rod defines a second length L2 that is less than the first length L1. For example, the second length L2 is 50 to 90 percent of the first length L1. In some embodiments, the second length L2 is 60 to 75 percent of the first length L1. The longer configuration of the damper rod 330 will have more movement at rod second end 360, which will change the damping characteristics of the strut system 130. The rod body 340 is sized so that when the damper rod 330 is secured to the strut inner base 200, the damper rod 330 is under tension loading against the guide shaft 400. This configuration maintains a slip or sliding contact between the bushing 390 and the guide shaft 400 to provide the friction for the generation of damping when the damper rod 330 moves relative to the strut body 160.

Figure 4:
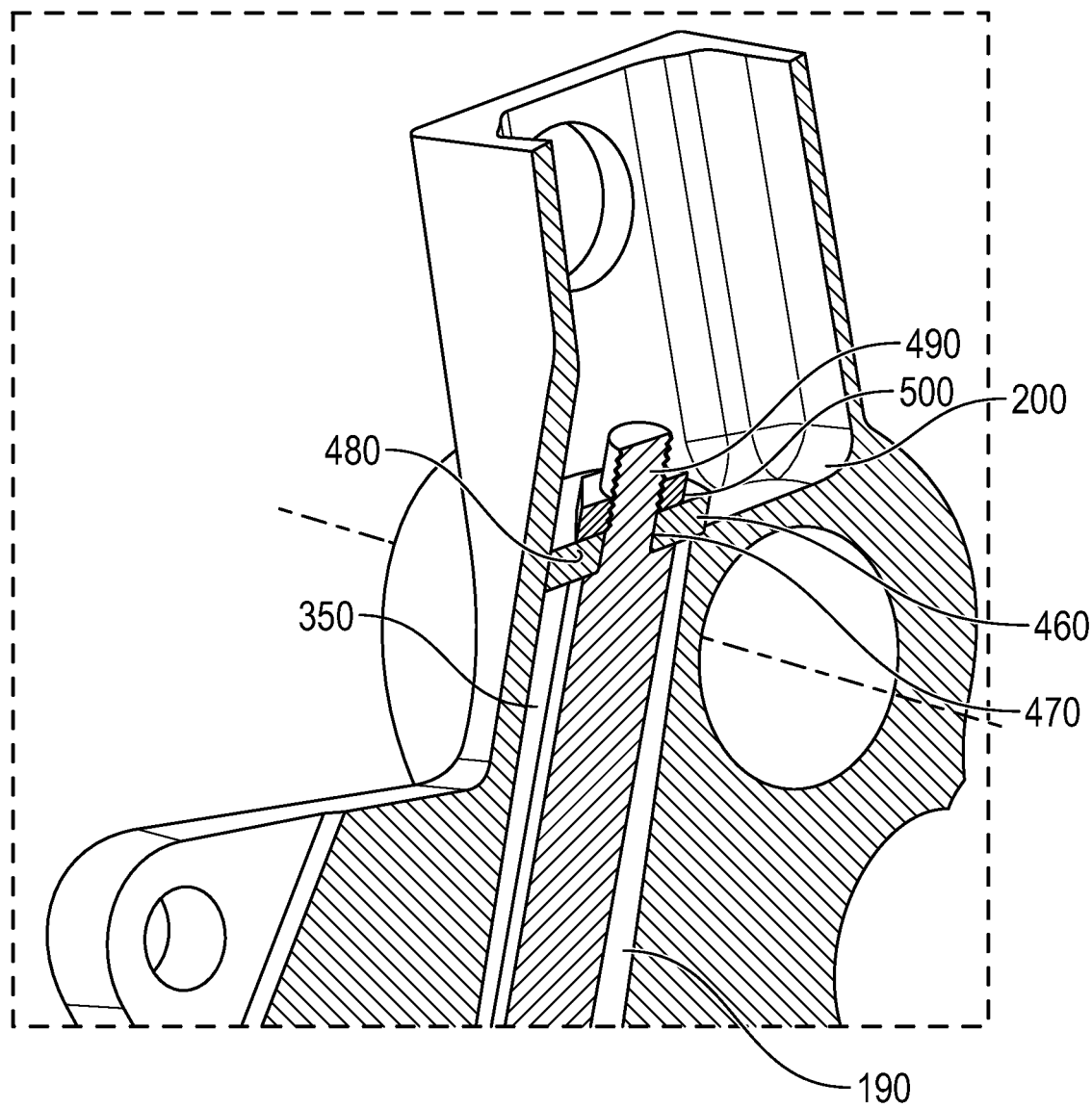
FIG. 4 show additional details of a portion of the strut and damper rod, as identified in FIG. 2.

As shown in FIGS. 3 and 4, the strut system 130 further includes a ring flange 460 that is fixed to the strut inner base 200. The ring flange 460 has a flange aperture 470 (FIG. 4) that opens to the strut conduit 190. The rod first end 350 has a shoulder portion 480 that is larger than the flange aperture 470. The rod first end 350 has a threaded shaft 490 that extends from the shoulder portion 480 and though the flange aperture 470. The strut system 130 includes another nut 500 (or second nut) that is secured to the threaded shaft 490, to secure the damper rod 330 within the strut conduit 190.

Figure 5:
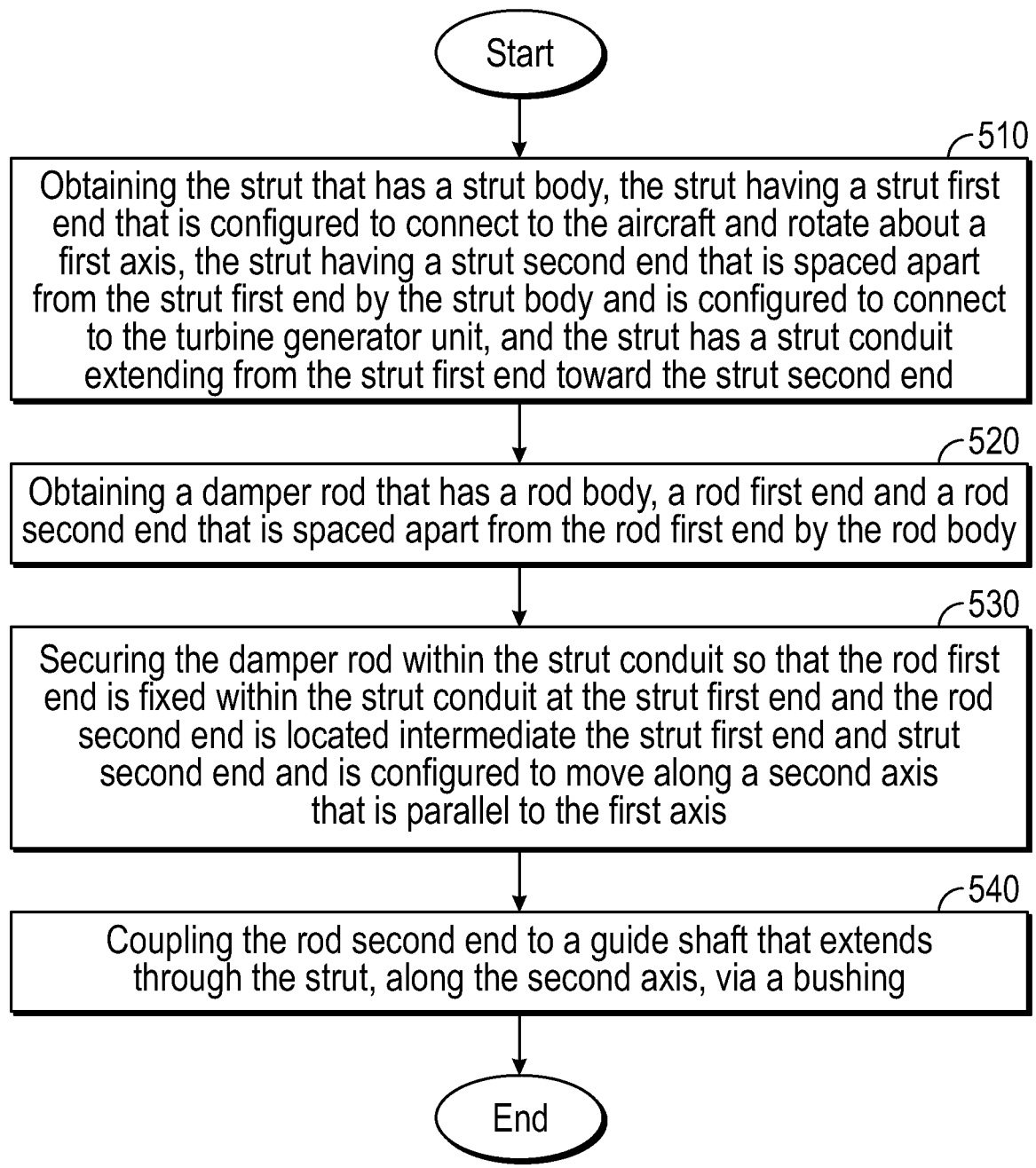
FIG. 5 is a flowchart showing a method of configuring a strut that couples a RAT to an aircraft.

Turning to FIG. 5, a flowchart shows a method of manufacturing a strut system 130 of a RAT 110. As shown in block 510, the method includes obtaining the strut 150 having the strut body 160 and the strut first end 170 that is configured to connect to the aircraft 100 and rotate about the first axis 140. The strut 150 has a strut second end 180 spaced apart from the strut first end 170 by the strut body 160 and is configured to connect to the RAT turbine generator unit 110A. The strut 150 has a strut inner conduit that extends from the strut first end 170 toward the strut second end 180. As shown in block 520, the method includes obtaining a damper rod 330 that has a rod body 340, a rod first end 350 and the rod second end 360 that is spaced apart from the rod first end 350 by the rod body 340. As shown in block 530, the method includes securing the damper rod 330 within the strut conduit 190. With this configuration, the rod first end 350 is fixed within the strut conduit 190 at the strut first end 170 and the rod second end 360 is located intermediate the strut first end 170 and the strut second end 180 and is configured to move along the second axis 380 that is parallel to the first axis 140. As shown in block 540, the method includes coupling the rod second end 360 to the guide shaft 400 that extends through the strut 150, along the second axis 380, via the bushing 390.

The above disclosure provides a strut system 130 of a RAT 110 for connecting a RAT turbine generator unit 110A to an aircraft 100. The strut 150 includes an inner damper rod 330, located in a strut conduit 190, which dampens resonant induced forces generated along the pivot axis when the RAT is deployed. A guide shaft 400 is disposed on a second axis 380 that is parallel to the first axis 140 and extends through a bushing 390 of the damper rod 330 to frictionally dampen sliding motion of the damper rod 330. The effect is dampening the resonance induced forces in the strut via the application of frictional (i.e., Coulomb) damping. The damper rod 330 may be high strength steel and the guide shaft 400 may be a case-hardened metal component. The rod first end 350 of the damper rod 330 may be connected to the strut inner base 200 inside the strut conduit 190. The bushing 390 may be attached to the rod second end 360 of the damper rod 330. The guide shaft 400 may extend through the outer surface 270 of the strut 150 and through the bushing 390 and may be locked against the strut 150 by a nut 450. The rod first end 350 of the damper rod 330 may include a threaded shaft 490 so that it may be secured to the strut inner base 200. The rod body 340 may be sized so that when the damper rod 330 is secured to the strut inner base 200, the damper rod 330 is under tension loading against the guide shaft 400 to maintain a contact between the bushing 390 and the guide shaft 400. With the disclosed configuration, vibrations in the lateral direction, along the first axis 140, cause the guide shaft 400 and bushing 390 to slide against each other, resulting in frictional energy dissipation, reducing resonant generated forces.

With the above embodiments, static and dynamic loads are transferred either way between the aircraft and the turbine-generator unit of the RAT through the strut. The inner damper rod mounted within the strut reduces the vibration loads that are transferred from the aircraft to the RAT.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A strut system for coupling a ram-air turbine (RAT) to an aircraft, comprising:
   a strut that includes a strut body, the strut having a strut first end that is configured to connect to the aircraft and rotate about a first axis, the strut having a strut second end that is spaced apart from the strut first end by the strut body and is configured to connect to a RAT turbine generator unit,
   wherein the strut has a strut conduit extending from the strut first end toward the strut second end; and
   a damper rod that includes a rod body and disposed within the strut conduit, the damper rod having a rod first end that is fixed within the strut conduit at the strut first end, and a rod second end that is spaced apart from the rod first end by the rod body and is located intermediate the strut first end and the strut second end, wherein the rod second end is configured to move along a second axis that is parallel to the first axis.

2. The system of claim 1, wherein
the rod second end forms a bushing, and the system further includes:
a guide shaft that extends through the strut, along the second axis, and through the bushing.

3. The system of claim 2, wherein:
the damper rod is formed of high strength steel and the guide shaft is case-hardened metal.

4. The system of claim 2, wherein:
the guide shaft is a shank of a bolt; and
the bolt includes a bolt head disposed against an outer surface of the strut, and the bolt has a threaded end spaced apart from the bolt head by the guide shaft and extends through the outer surface of the strut; and
the system further comprises a nut that is configured to engage the threaded end and secure the bolt to the strut.

5. The system of claim 4, wherein:
the strut first end has a strut inner base that defines an opened end of the strut conduit; and
the system further includes:
a ring flange that is fixed to the strut inner base, the ring flange having a flange aperture that opens to the strut conduit,
wherein the rod first end has a shoulder portion that is larger than the flange aperture and a threaded shaft that extends from the shoulder portion and though the flange aperture; and
another nut that is secured to the threaded shaft, to secure the damper rod within the strut conduit.

6. The system of claim 5, wherein:
the strut first end has a shaft bore that is defined along the first axis; and
the shaft bore is adjacent to the strut inner base and the strut conduit.

7. The system of claim 5, wherein:
the rod body is sized so that when the damper rod is secured to the strut inner base, the damper rod is under tension loading against the guide shaft to maintain a contact between the bushing and the guide shaft.

8. The system of claim 7, wherein:
the rod body has a rectangular cross section defining a rod width that is wider along the second axis;
the strut conduit defines a diameter, wherein the rod width is between sixty percent and ninety percent of the diameter of the strut conduit;
the strut conduit defines a first length; and
the damper rod defines a second length that is less than the first length.

9. An aircraft comprising:
a ram-air turbine (RAT);
a strut system that couples the RAT to the aircraft, the strut system including:
a strut that includes a strut body, the strut having a strut first end that is connected to the aircraft and configured to rotate about a first axis, the strut having a strut second end that is spaced apart from the strut first end by the strut body and is connected to the RAT turbine generator unit,
wherein the strut has a strut conduit extending from the strut first end toward the strut second end; and
a damper rod that includes a rod body and disposed within the strut conduit, the damper rod having a rod first end that is fixed within the strut conduit at the strut first end, and a rod second end that is spaced apart from the rod first end by the rod body and is located intermediate the strut first end and the strut second end, wherein the rod second end is configured to move along a second axis that is parallel to the first axis.

10. The aircraft of claim 9, wherein:
the rod second end includes a bushing, and
the strut system further includes a guide shaft that extends through the strut, along the second axis, and through the bushing.

11. The aircraft of claim 10, wherein:
the guide shaft is a shank of a bolt; and
the bolt includes a bolt head disposed against an outer surface of the strut, and the bolt has a threaded end spaced apart from the bolt head by the guide shaft and extends through the outer surface of the strut; and
the system further comprises a nut that is configured to engage the threaded end and secure the bolt to the strut.

12. The aircraft of claim 11, further comprising:
the damper rod is formed of high strength steel and the guide shaft is case-hardened metal.

13. The aircraft of claim 11, wherein:
the strut first end has a strut inner base that defines an opened end of the strut conduit;
the system further includes:
a ring flange that is fixed to the strut inner base, the ring flange having a flange aperture that opens to the strut conduit,
wherein the rod first end has a shoulder portion that is larger than the flange aperture and a threaded shaft that extends from the shoulder portion and though the flange aperture; and
another nut that is secured to the threaded shaft, to secure the damper rod within the strut conduit.

14. The aircraft of claim 13, wherein:
the strut first end has a shaft bore that is defined along the first axis; and
the shaft bore is adjacent to the strut inner base and the strut conduit; and
the strut system further includes a shaft that is connected to the aircraft and extends through the shaft bore.

15. The aircraft of claim 13, wherein:
the rod body is sized so that when the damper rod is secured to the strut inner base, the damper rod is under tension loading against the guide shaft to maintain a contact between the bushing and the guide shaft.

16. The aircraft of claim 15, wherein:
the rod body has a rectangular cross section defining a rod width that is wider along the second axis;
the strut conduit defines a diameter, wherein the rod width is between sixty percent and ninety percent of the diameter of the strut conduit;
the strut conduit defines a first length; and
the damper rod defines a second length that is less than the first length.

17. A method of configuring a strut that couples a ram-air turbine (RAT) to an aircraft, comprising:
obtaining the strut that has a strut body, the strut having a strut first end that is configured to connect to the aircraft and rotate about a first axis, the strut having a strut second end that is spaced apart from the strut first end by the strut body and is configured to connect to the RAT turbine generator unit, and the strut has a strut conduit extending from the strut first end toward the strut second end;

obtaining a damper rod that has a rod body, a rod first end and a rod second end that is spaced apart from the rod first end by the rod body; and securing the damper rod within the strut conduit so that the rod first end is fixed within the strut conduit at the strut first end and the rod second end is located intermediate the strut first end and the strut second end and is configured to move along a second axis that is parallel to the first axis.

18. The method of claim 17, comprising:

coupling the rod second end to a guide shaft that extends through the strut, along the second axis, via a bushing.

\* \* \* \* \*